(12) United States Patent
Morath (10) Patent No.: US 11,603,761 B2
(45) Date of Patent: Mar. 14, 2023

(54) LIQUID COLUMN GENERATOR

(71) Applicant: Frédéric Morath, Grône (CH)

(72) Inventor: Frédéric Morath, Grône (CH)

(*) Notice: Subject to any disclaimer, the term of this patent is extended or adjusted under 35 U.S.C. 154(b) by 0 days.

(21) Appl. No.: 17/532,477

(22) Filed: Nov. 22, 2021

(65) Prior Publication Data

US 2022/0162942 A1 May 26, 2022

(30) Foreign Application Priority Data

Nov. 23, 2020 (EP) .................................... 20209328

(51) Int. Cl.
*F01B 23/10* (2006.01)
*F03C 1/00* (2006.01)
(Continued)

(52) U.S. Cl.
CPC ................ *F01B 23/10* (2013.01); *F01B 9/02* (2013.01); *F01B 25/10* (2013.01); *F03C 1/00* (2013.01); *F03C 1/013* (2013.01); *F03C 1/26* (2013.01)

(58) Field of Classification Search
CPC .. F01B 23/10; F01B 9/02; F01B 25/10; F01B 23/08; F03C 1/00; F03C 1/002;
(Continued)

(56) References Cited

U.S. PATENT DOCUMENTS 4,267,695 A * 5/1981 Micciche ............. F01B 11/007
60/473
2008/0289324 A1 * 11/2008 Marion ................... F03B 17/02
60/407

FOREIGN PATENT DOCUMENTS

KR     20030013892 A    2/2003
WO      2020053486 A1    3/2020

OTHER PUBLICATIONS

European Search Report; European Patent Office; Patent Application No. 20209328.2; dated Apr. 8, 2021; 5 pages.

* cited by examiner

*Primary Examiner* — Jacob M Amick
(74) *Attorney, Agent, or Firm* — Taft Stettinius & Hollister LLP (57) ABSTRACT

A generator is described comprising in particular a vertical supply column that can be filled with a certain quantity of liquid, an intake valve disposed at a base of the vertical supply column, and a leaktight tank communicating with the vertical supply column via the intake valve, which leaktight tank can be filled with liquid. The generator also comprises an exhaust valve disposed on the leaktight tank and capable of releasing pressure generated in the leaktight tank, and a piston-forming device disposed inside the leaktight tank so as to be immersed in the liquid contained in the leaktight tank. This piston-forming device is capable of being set in reciprocating movement between an upper position and a lower position, the piston-forming device comprising a first, float-forming portion capable of bringing the piston-forming device into the upper position and a second portion forming an output shaft. The generator further comprises a converter device coupled to the output shaft, which converter device is capable of converting the reciprocating movement of the piston-forming device into mechanical or electrical energy. The generator is configured in such a way that, in operation, the leaktight tank is filled with liquid, and in such a way as to repeat a sequence of operating phases in order to induce the reciprocating movement of the piston-forming device.

23 Claims, 8 Drawing Sheets

(51) Int. Cl.
*F03C 1/26* (2006.01)
*F01B 9/02* (2006.01)
*F01B 25/10* (2006.01)
*F03C 1/013* (2006.01)

(58) Field of Classification Search
CPC ........ F03C 1/003; F03C 1/007; F03C 1/0073;
F03C 1/0076; F03C 1/013; F03C 1/0135;
F03C 1/10; F03C 1/26
See application file for complete search history.

LIQUID COLUMN GENERATOR

CROSS REFERENCE TO RELATED APPLICATIONS

This application claims priority to European Patent Application No. 20209328.2 filed Nov. 23, 2020, the contents of which are hereby incorporated by reference in their entirety.

TECHNICAL FIELD

The present invention relates generally to a generator that allows mechanical or electrical energy to be produced from a renewable energy source, in particular water or any other liquid. More particularly, the present invention relates to such a generator that exploits the pressure exerted by a column of liquid.

TECHNOLOGICAL BACKGROUND

Various types of generators exist in the field, especially generators that allow energy to be produced from a renewable energy source, in particular hydraulic, geothermal, wind or solar energy. For domestic use, geothermal, wind and/or solar energy sources are normally used, the production of energy from a hydraulic energy source usually being reserved for large and complex installations, such as hydroelectric dams or penstock plants.

There remains a need for generators suited to domestic use that exploit water (or other liquid) as renewable energy source.

SUMMARY OF THE INVENTION

One general aim of the present invention is to provide a generator that allows mechanical or electrical energy to be produced from a renewable energy source, in this particular case a liquid, such as water.

More particularly, one aim of the present invention is to provide such a generator that does not require the implementation of complex means and which is relatively inexpensive to produce.

Moreover, one aim of the present invention is to provide such a solution which is particularly suited to domestic use.

Another aim of the present invention is to provide a solution which constitutes an alternative or a viable complement to the generation of energy by other renewable energy sources.

Thus, a generator is provided whose features are set out in claim 1, namely a generator comprising:
vertical supply column capable of being filled with a certain quantity of liquid;
an intake valve disposed at a base of the vertical supply column;
a leaktight tank communicating with the vertical supply column via the intake valve, which leaktight tank is capable of being filled with liquid;
an exhaust valve disposed on the leaktight tank and capable of releasing pressure generated in the leaktight tank;
a piston-forming device disposed inside the leaktight tank so as to be immersed in the liquid contained in the leaktight tank, which piston-forming device is capable of being set in reciprocating movement between an upper position and a lower position, the piston-forming device comprising a first, float-forming portion capable of bringing the piston-forming device into the upper position and a second portion forming an output shaft; and
a converter device coupled to the output shaft, which converter device is capable of converting the reciprocating movement of the piston-forming device into mechanical or electrical energy.

The generator according to the invention is configured in such a way that, in operation, the leaktight tank is filled with liquid, and in such a way as to repeat the following sequence of operating phases in order to induce the reciprocating movement of the piston-forming device, namely:
a first operating phase during which the intake valve is closed and the vertical supply column is filled with liquid so as to form a column of liquid above the leaktight tank;
a second operating phase during which the exhaust valve is closed and the intake valve is open in order to connect the vertical supply column and the leaktight tank, generating an increase in pressure in the leaktight tank and causing a displacement of the piston-forming device to the lower position; and
a third operating phase during which the intake valve is closed and the exhaust valve is open in order to release excess pressure formed inside the leaktight tank, allowing the piston-forming device to return to the upper position under the action of the first, float-forming portion.

Preferably, the second portion forming the output shaft comprises a plurality of individual output shafts. In this context, each output shaft can in particular be coupled to a dedicated float device, the float devices being coupled to one another in order to constitute the first, float-forming portion of the piston-forming device.

According to a preferred variant of the invention, each output shaft is provided with a compressible cuff ensuring sealing between the liquid contained in the leaktight tank and a part of the output shaft that is disposed inside the leaktight tank, the compressible cuff defining a compressible volume devoid of liquid covering the part of the output shaft that is disposed inside the leaktight tank.

The first, float-forming portion may advantageously also form a head of the piston-forming device. Alternatively, a piston head-forming portion could be disposed above the first, float-forming portion.

In a preferred variant, the output shaft emerges partly outside the leaktight tank and the converter device is coupled to the part of the output shaft emerging outside the leaktight tank. In this context, with regard to the use of the aforementioned compressible cuff, the compressible cuff is preferably interposed between the first, float-forming portion and an internal wall of the leaktight tank. The output shaft may in particular emerge through a bottom part of the leaktight tank.

The converter device may in particular comprise a mechanism capable of converting the reciprocating movement of the piston-forming device into a rotary movement. In this particular context, it is also advantageous to also equip the converter device with an alternator driven by the rotary movement in order to produce electrical energy.

According to a variant, the generator further comprises a device for automatically controlling opening and closing of the intake and exhaust valves, such as a mechanical distributor.

According to another embodiment, the generator further comprises a starter for initiating rotation of a flywheel coupled to the generator, the generator being configured so as to maintain rotation of the flywheel.

Preferably, the vertical supply column is configured to allow formation of a column of liquid having a height of the order of 50 cm to 150 cm, namely approximately 20 to 60 inches. In this context, the diameter of the vertical supply column is preferably less than 20 cm, or 8 inches.

The capacity of the leaktight tank is, for its part, preferably of the order of 20 to 50 litres, namely approximately 5 to 13.5 US gallons, making the generator suitable for domestic use, greater capacities being perfectly conceivable, however.

Also claimed is an installation comprising a generator according to the invention, which is supplied with liquid, such as water, in particular by means of a rainwater collection tank or a running water supply. It would also be possible to envisage using discharge water delivered at the output of sanitary installations.

In an advantageous variant, the installation further comprises:
- a supply tank capable of supplying the liquid necessary for filling the vertical supply column;
- a collection tank capable of recovering the liquid coming from the leaktight tank; and
- a pump capable of returning the liquid from the collection tank to the supply tank.

The abovementioned pump is preferably supplied with energy produced by photovoltaic panels or by a wind turbine.

Also claimed is a method of generating mechanical or electrical energy using the generator according to the invention, comprising the following steps:
a) closing the intake valve and filling the vertical supply column with liquid so as to form a column of liquid above the leaktight tank which is filled with liquid;
b) closing the exhaust valve and opening the intake valve in order to connect the vertical supply column and the leaktight tank, generating an increase in pressure in the leaktight tank and causing a displacement of the piston-forming device to the lower position;
c) closing the intake valve and opening the exhaust valve in order to release excess pressure formed inside the leaktight tank, allowing the piston-forming device to return to the upper position under the action of the first, float-forming portion; and
d) repeating steps a) to d) so as to induce the reciprocating movement of the piston-forming device and allow the converter device to convert this reciprocating movement into mechanical or electrical energy.

Other aspects of the invention are explained hereinbelow in the present description.

BRIEF DESCRIPTION OF THE DRAWINGS

The features and advantages of the present invention will become more clearly apparent upon reading the following detailed description of embodiments of the invention, which are presented purely as nonlimiting examples and are illustrated by the appended drawings, in which.

EMBODIMENTS OF THE INVENTION

Various aspects of the present invention will be described with reference to various preferred embodiments as illustrated in particular by FIGS. 1 to 4.

Figure 1:
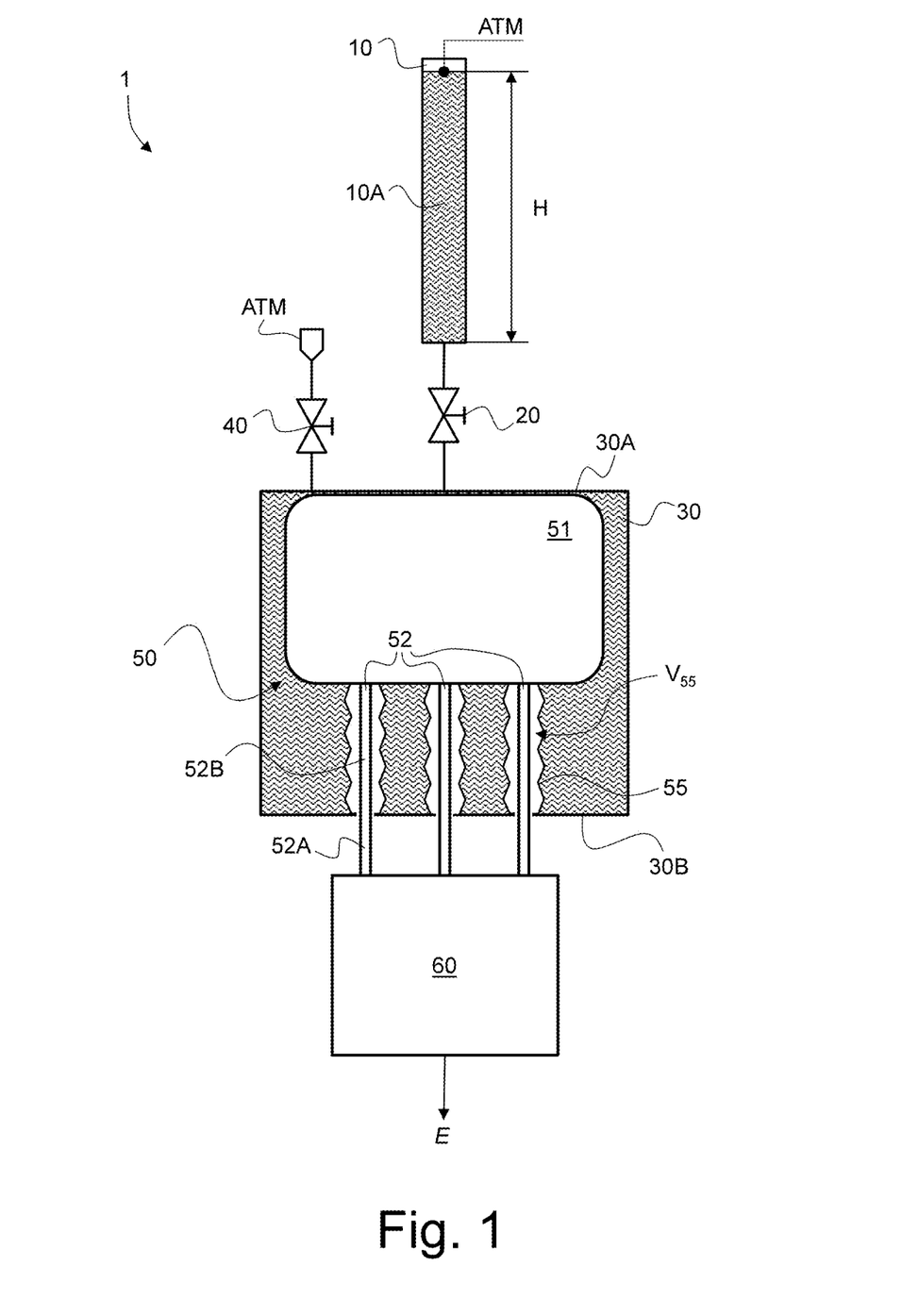
FIG. 1 shows a schematic diagram of a generator according to an embodiment of the invention.

FIG. 1 is a schematic diagram of a generator, designated generally by reference numeral 1, according to an embodiment of the invention. This generator 1 in particular comprises a vertical supply column 10 that can be filled with a certain quantity of water so as to form a column of water 10A of a determined height H. It will be understood that the surface of the column of water 10A is exposed to atmospheric pressure, designated ATM. This vertical supply column 10 is disposed above a leaktight tank 30, which is itself filled with water, capable of being connected with the vertical supply column 10 via an intake valve 20 placed at a base of the vertical supply column 10, on the top part 30A of the leaktight tank 30. An exhaust valve 40 is also disposed on the leaktight tank 30, which exhaust valve 40 is capable of releasing pressure generated in the leaktight tank 30 and allowing excess water to be discharged. This exhaust valve 40 makes it possible here to bring the surface pressure of the liquid contained in the leaktight tank 30 to atmospheric pressure ATM and allows the expulsion of excess water, as will be understood upon reading the following description. Disposed inside the leaktight tank 30 is a piston-forming device 50, which is at least partly immersed in the water contained in the leaktight tank 30. This piston-forming device 50 is capable of being set in reciprocating movement between a lower position (see FIGS. 2B and 2C) and an upper position, as illustrated (see also FIGS. 2A and 2D). In the illustrated example, the piston-forming device 50 comprises a first, float-forming portion 51 capable of bringing the piston-forming device 50 into the upper position and a second portion forming an output shaft 52, which partly emerges, in the illustrated case, as designated by reference 52A, outside the leaktight tank 30. In the illustrated embodiment, the second portion forming the output shaft 52 comprises, in fact, a plurality of individual output shafts 52 of which a part 52A emerges outside the leaktight tank 30, advantageously through a bottom part 30B of the leaktight tank 30, it being understood that corresponding openings are formed in the bottom part 30B of the leaktight tank 30 in order to allow the displacement of the individual output shafts 52.

Preferably, each output shaft 52 is provided with a compressible cuff 55 ensuring sealing between the water contained in the leaktight tank 30 and the part 52B of the output shaft 52 disposed inside the leaktight tank 30. Each compressible cuff 55 thus also ensures sealing at each opening formed in the bottom part 30B of the leaktight tank 30 to allow the passage of the associated output shaft 52 and defines a compressible volume, designated $V_{55}$, devoid of liquid, covering the part 52B of the output shaft 52 disposed inside the leaktight tank 30. Other solutions could be envisaged, however, for example a solution adopting a single compressible cuff enclosing all of the output shafts 52.

Figure 3A:
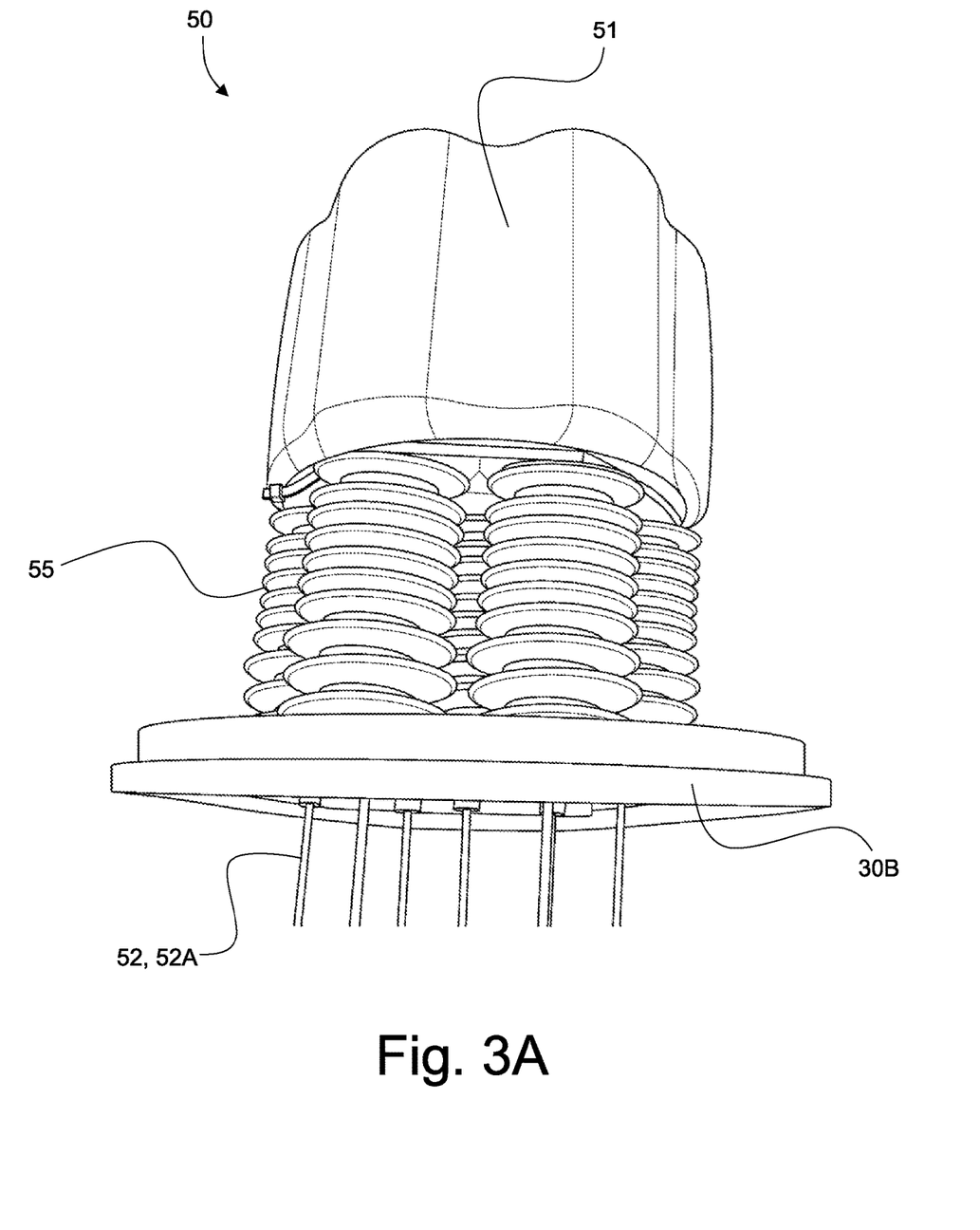
FIG. 3A is a first photographic illustration of a piston-forming device forming part of the generator according to an embodiment of the invention.
Figure 3B:
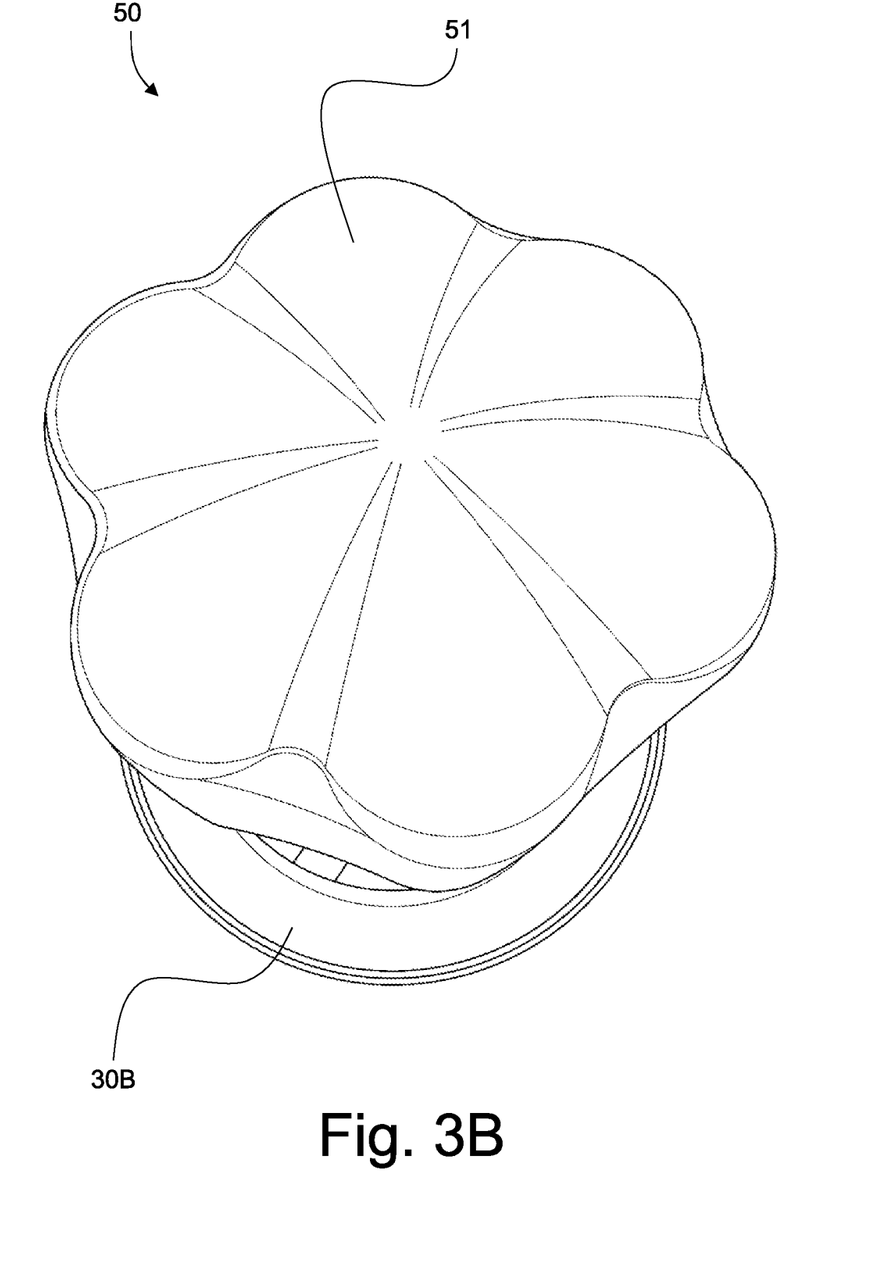
FIG. 3B is a second photographic illustration of a top part of the piston-forming device of FIG. 3A.
Figure 4:
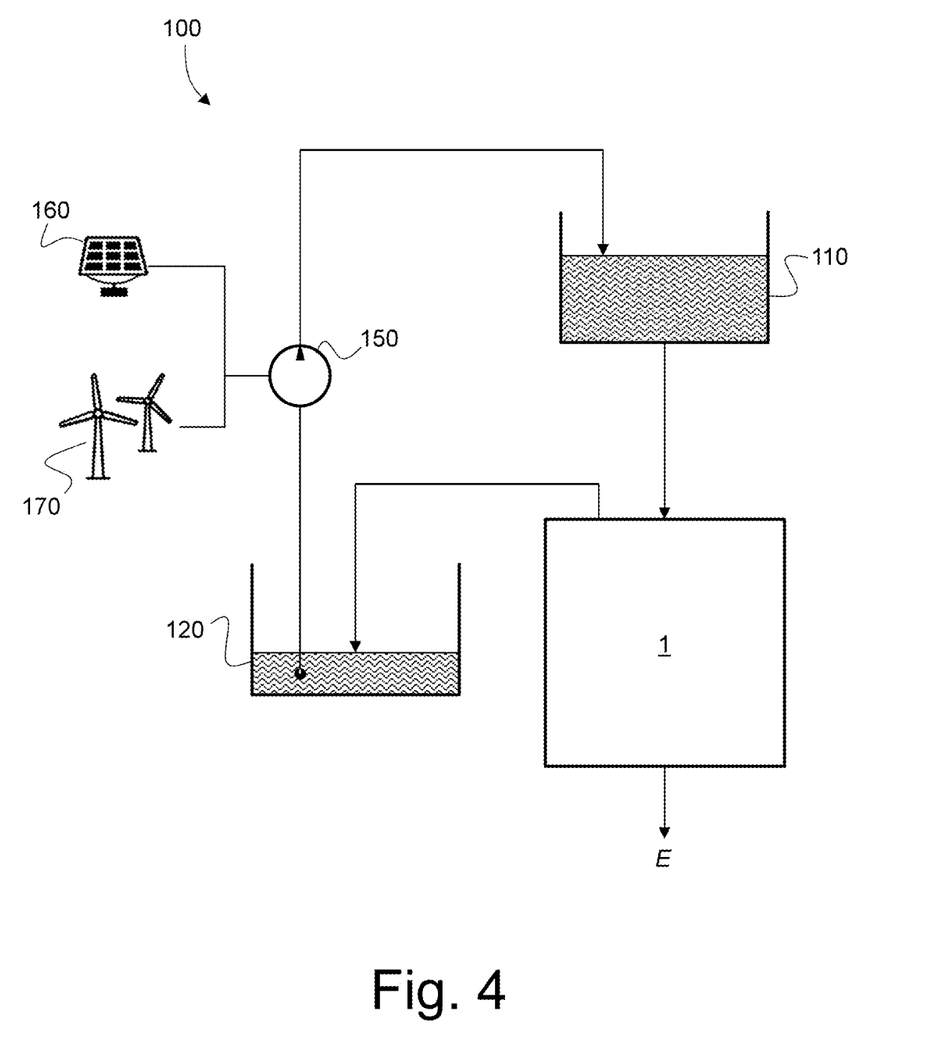
FIG. 4 is a schematic diagram of an installation comprising a generator according to the invention.

FIGS. 3A and 3B are photographic illustrations of a prototype of a piston-forming device 50, which consists of a set of seven individual output shafts 52 provided at their top end with a buoyancy device, for example a block of polystyrene or any other light and impermeable material exhibiting a good buoyancy capability. The set of buoyancy devices is, here, arranged in the form of a compact whole and retained by an elastic sheath so as to constitute the float-forming part 51 of the piston-forming device 50. This part 51 moreover constitutes a head of the piston-forming device 50. Visible in the photographic illustration of FIG. 3A are the compressible cuffs 55, similar to steering cuffs, mounted on the individual output shafts 52, between the float-forming portion 51 and the bottom part 30B of the leaktight tank 30, also visible in FIGS. 3A and 3B.

Referring once again to FIG. 1, the generator 1 further comprises a converter device 60 coupled here to the part 52A of the output shaft 52 emerging outside the leaktight tank 30. This converter device 60 can be any type of device capable of converting the reciprocating movement of the piston-forming device 50 into mechanical or electrical energy E. In particular, the converter device 60 can comprise a mechanism, known per se (such as a mechanism of the crankshaft type driven by link rods), capable of converting the reciprocating movement of the piston-forming device 50 into a rotary movement. In such case, the converter device preferably comprises an alternator driven by the rotary movement in order to produce electrical energy. As an illustrative example, such alternator may be a wind turbine alternator with permanent magnets, in particular permanent magnets made of neodymium. Tests have especially been performed by the Applicant using an alternator as commercially available from Missouri Wind and Solar, LLC (www.mwands.com) delivering approximately 12 volts at 150 rpm.

In the illustrated example, the vertical supply column 10 is dimensioned so as to allow the formation of a column of water 10A having a height H of the order of 50 cm to 150 cm, namely approximately 20 to 60 inches. The inner diameter of the vertical supply column 10 is, here, preferably less than 20 cm, or 8 inches. For its part, the leaktight tank 30 has a capacity of the order of 20 to 50 litres, namely approximately 5 to 13.5 US gallons. By way of illustration, a column of water of the order of 85 cm (approximately 33.5 inches), an inner diameter of the order of 6 cm (approximately 2.4 inches), and a leaktight tank with a capacity of the order of 25 litres (approximately 6.6 US gallons) allow a suitable implementation of the invention. It will be understood, however, that the invention is not specifically limited to these dimensions. Regarding the height H of the column of water 10A, such height will essentially depend in particular on the ceiling height available in the environment in which the generator according to the invention is installed.

The generator is configured in such a way that, in operation, the leaktight tank 30 is filled with liquid, and in such a way as to repeat the following sequence of operating phases described with reference to FIGS. 2A to 2D in order to induce the reciprocating movement of the piston-forming device 50.

Figure 2A:
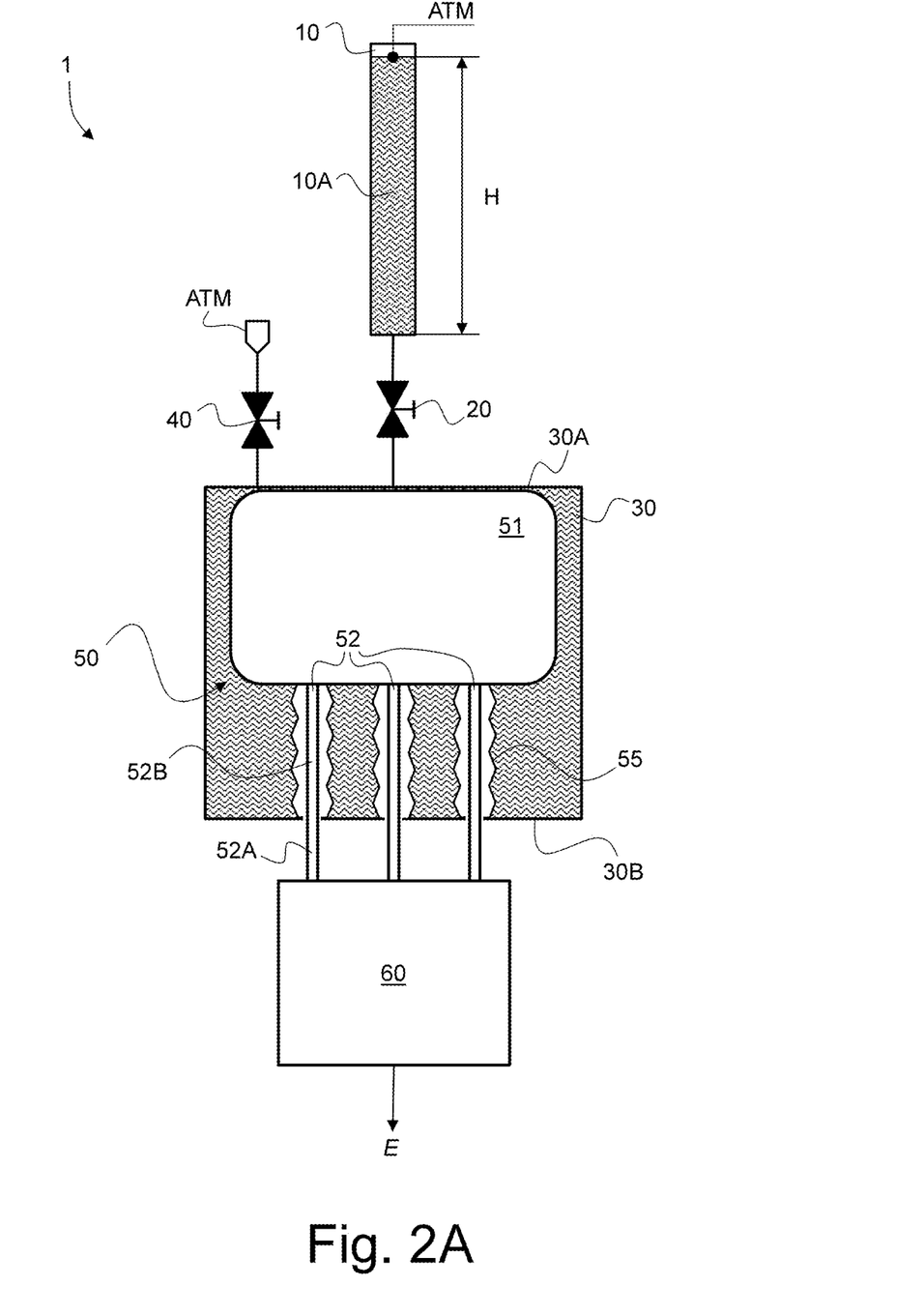
FIGS. 2A-D show successive operating phases of the generator of FIG. 1.

In a first operating phase, illustrated by FIG. 2A, the intake valve 20 is closed (as is the exhaust valve 40) and the supply column 10 is filled with water so as to form a column of water 10A of determined height H. It will consequently be understood that a pressure is generated at the base of the column of water 10A, the amplitude of which depends on the height H of the column of water 10A.

Figure 2B:
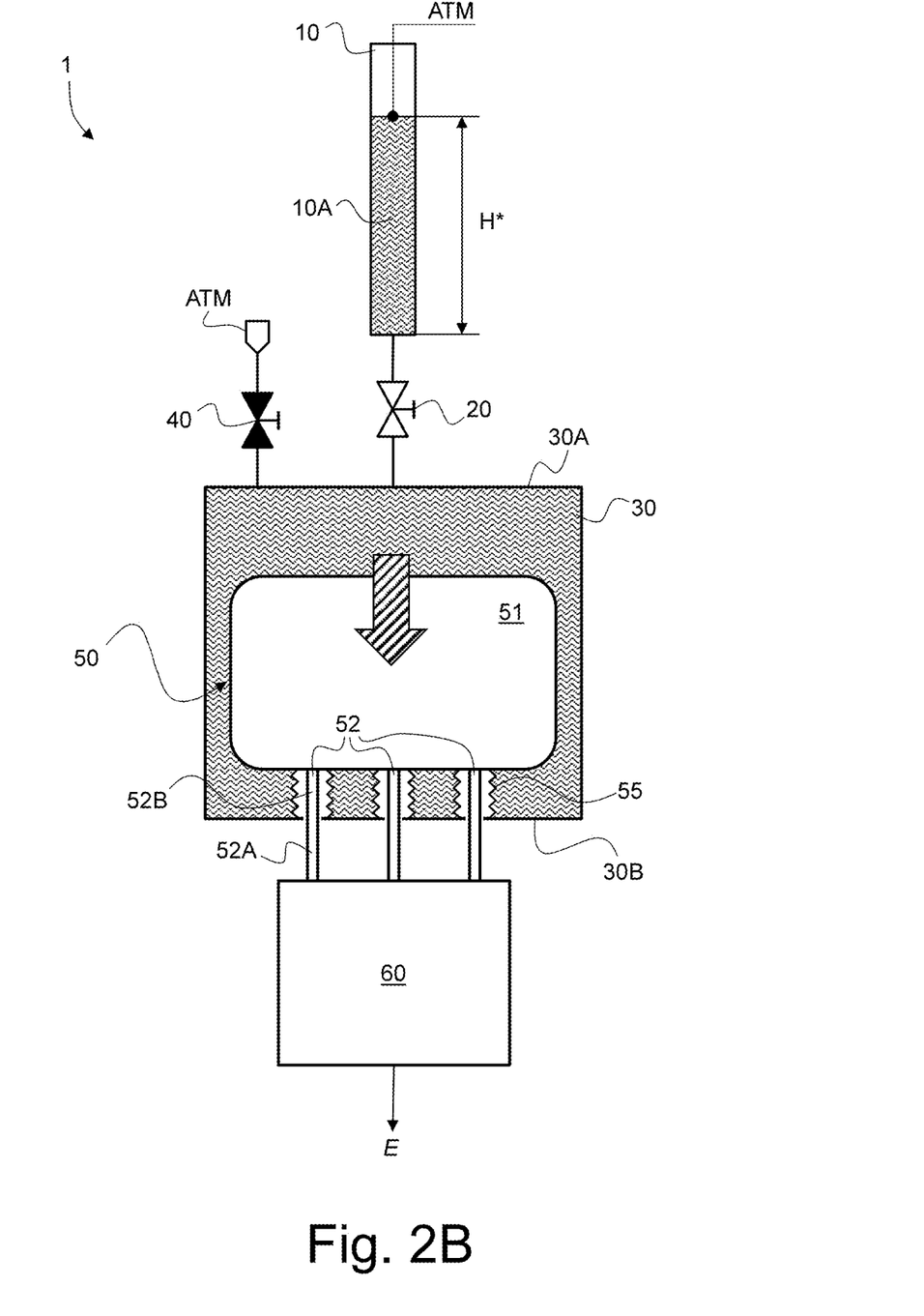

In a second operating phase, illustrated by FIG. 2B, the intake valve 20 is open (the exhaust valve 40 remaining closed) in order to connect the vertical supply column 10 and the leaktight tank 30, generating an increase in pressure in the leaktight tank 30 and causing a displacement of the piston-forming device 50 to the lower position. In the illustrated example, the increase in pressure in the leaktight tank 30 causes compression of the compressible cuffs 55 and a reduction of the compressible volume $V_{55}$ of each cuff 55, leading to an increase in the volume of water admitted into the leaktight tank 30 and a corresponding reduction of the height, designated H*, of the column of water 10A in the vertical supply column 10. The cuffs 55 in particular have the advantage of offering little resistance to compression upon the increase in pressure in the leaktight tank 30.

Figure 2C:
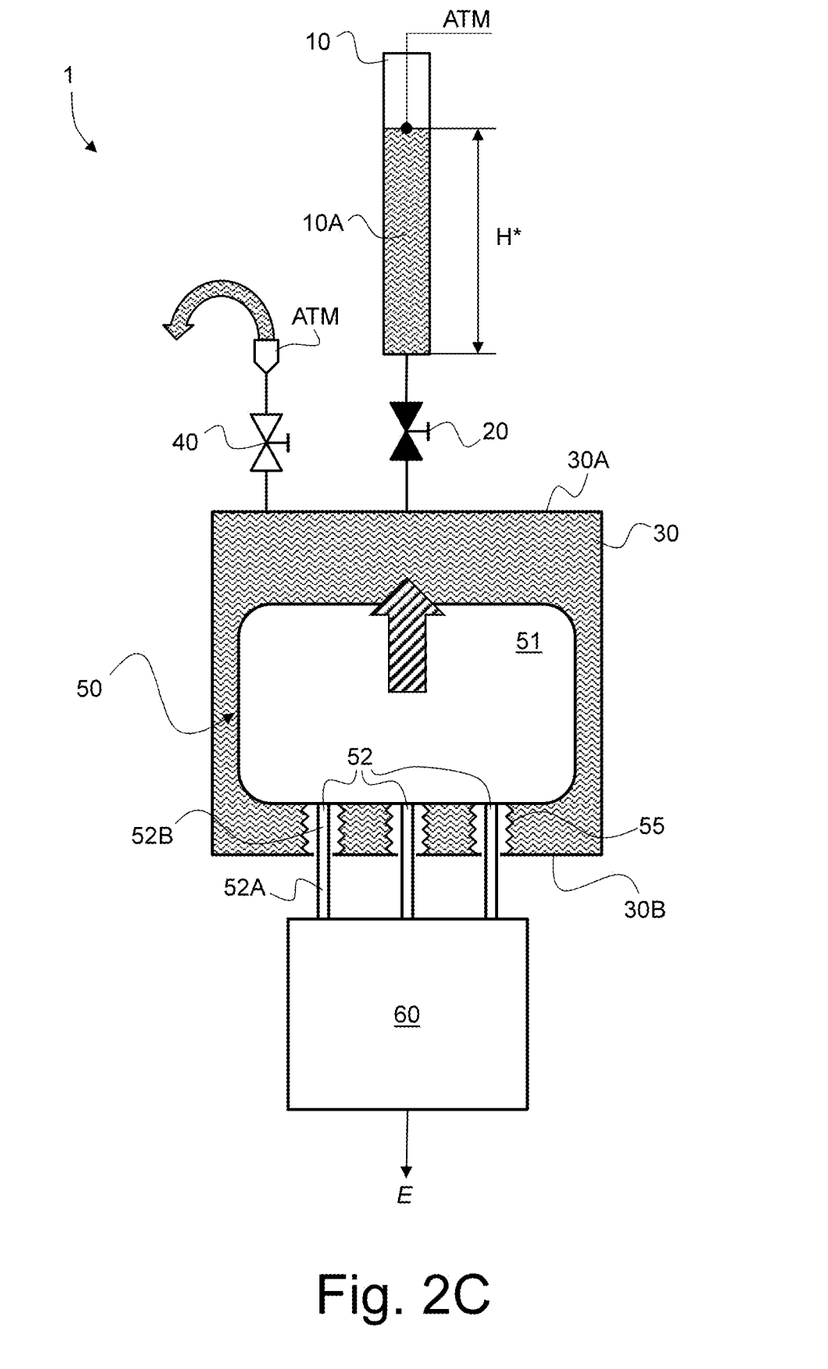

In a third operating phase, illustrated by FIG. 2C, the intake valve 20 is closed and the exhaust valve 40 is open in order to release excess pressure formed inside the leaktight tank 30. This balancing of pressure allows the piston-forming device 50 to return to the upper position under the action of the float-forming portion 51, a part of the water contained in the leaktight tank 30 being ejected via the exhaust valve 40 during this phase.

Figure 2D:
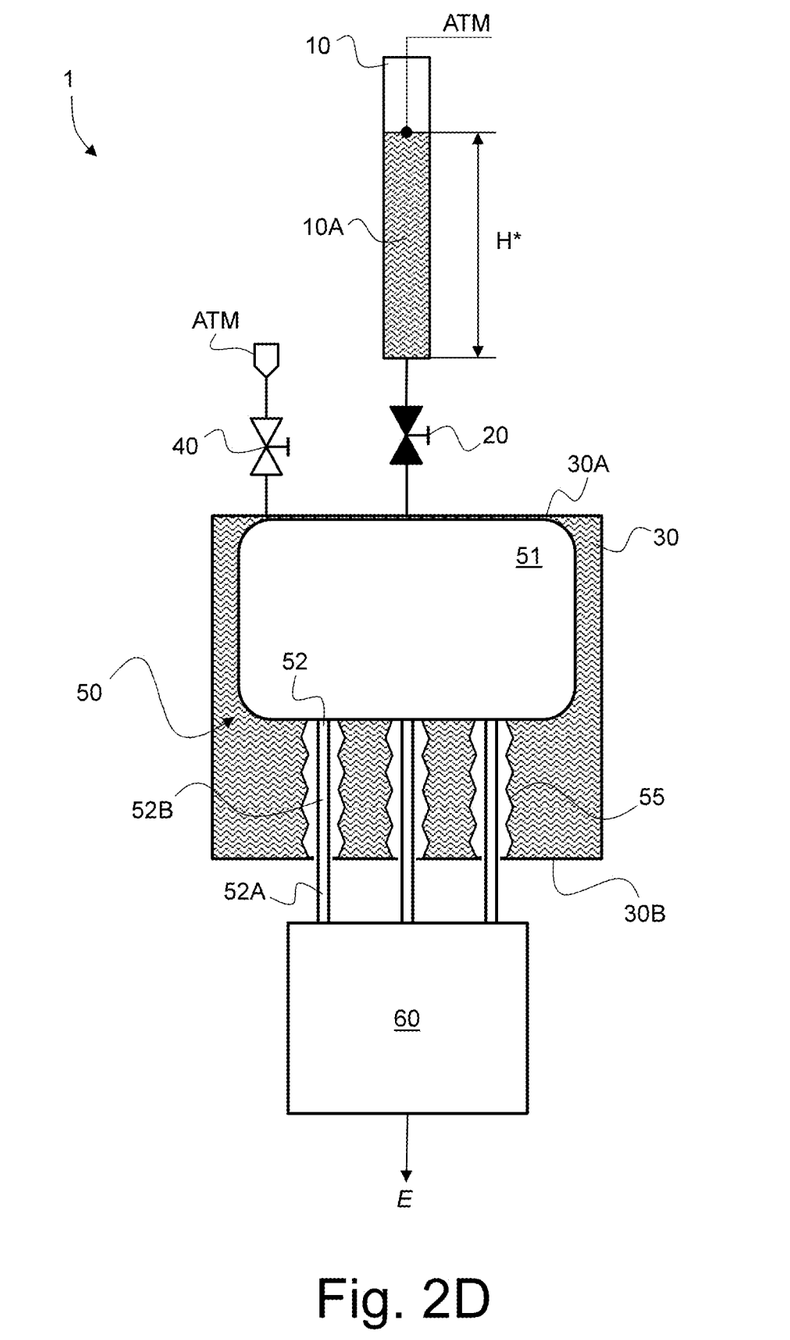

At the end of this third operating phase, illustrated by FIG. 2D, the piston-forming device 50 is thus returned to the upper position under the action of the first, float-forming portion 51, and the process can thus be repeated in order to induce a reciprocating movement of the piston-forming device 50 between its upper and lower positions. It will be understood that water is added in the vertical supply column 10 in order to bring the column of water 10A back to the desired height H at the start of each cycle.

The control of the intake valve 20 and of the exhaust valve 40 can be ensured by a mechanical distributor controlling the actuation timing of the valves 20, 40, it being understood that the valves 20, 40 are never open simultaneously.

The generator according to the invention operates at a relatively slow speed, similar to a steam engine, and this generator should preferably be equipped with a flywheel and a starter in order to ensure priming of operation of the generator, the generator thus being configured to maintain rotation of the flywheel. It will accordingly be understood that the flywheel operates as an energy accumulator in mechanical form.

The supply of water to the generator 1 can especially be ensured by means of a rainwater collection tank or a running water supply. It is also possible to envisage using discharge water delivered at the output of sanitary installations or any other suitable liquid.

It will be understood that a certain quantity of water is "consumed" during each cycle of the generator 1. According to an advantageous variant of the invention, it is conceivable to provide an installation 100 as illustrated schematically in FIG. 4 comprising a collection tank 120 capable of recovering the water coming from the leaktight tank 30 of the generator 1 (namely, the water ejected via the exhaust valve 40), and of returning this water into a supply tank 110 supplying the water necessary for filling the vertical supply column 10 of the generator 1. To this end, a pump 150 can be provided, preferably supplied with energy produced by photovoltaic panels 160 or by a wind turbine 170, in order to return the water from the collection tank 120 to the supply tank 110. This pumping system operates in the manner of a pumped storage power station (or "PSPS") that allows the excess electrical energy produced by the photovoltaic panels 160 and/or the wind turbine 170 to be exploited to pump the water collected in the collection tank 120 and return it into the supply tank 110. It will be understood in that respect that the pump 150 does not need to be operated continuously, but only periodically in order to return the collected water to the supply tank 110, consequently allowing operation in a closed loop.

It will be generally understood that various modifications and/or improvements that are obvious to the person skilled in the art can be made to the embodiments described in the present description without departing from the scope of the invention defined by the appended claims.

In a variant of the invention, it could for example be conceivable to have the converter device disposed inside the leaktight tank, so that there is no need for the output shaft of the piston-forming device to emerge from the leaktight tank.

Moreover, although the embodiments of the invention have been presented with respect to the use of water as renewable energy source, any other liquid could be used in principle.

LIST OF THE REFERENCE SIGNS USED IN THE PRESENT DESCRIPTION AND IN THE DRAWINGS 1 generator
10 vertical supply column
10A column of water
20 intake valve
30 leaktight tank
30A top part of the leaktight tank 30
30B bottom part of the leaktight tank 30
40 exhaust valve
50 piston-forming device
51 first, float-forming portion (top portion) of the piston-forming device 50
52 second portion forming output shaft (bottom portion) of the piston-forming device 50/individual output shafts
52A part of the output shaft 52 emerging from the leaktight tank 30
52B part of the output shaft 52 disposed inside the leaktight tank 30
55 compressible cuffs
60 converter device
100 installation comprising the generator 1
110 supply tank allowing the vertical supply column 10 of the generator 1 to be supplied with water
120 collection tank allowing water coming from the leaktight tank 30 of the generator 1 to be recovered
150 pump
160 photovoltaic panels
170 wind turbine
H height of the column of water 10A (before opening of the intake valve 20)
H* height of the column of water 10A (after opening of the intake valve 20 and movement of the piston-forming device 50 to the lower position)
$V_{55}$ compressible volume defined by the compressible cuff 55, devoid of liquid, covering the part 52B of the output shaft 52 disposed inside the leaktight tank 30

The invention claimed is:

1. A generator comprising:
a vertical supply column that can be filled with a certain quantity of liquid;
an intake valve disposed at a base of the vertical supply column;
a leaktight tank communicating with the vertical supply column via the intake valve, which leaktight tank is capable of being filled with liquid;
an exhaust valve disposed on the leaktight tank and capable of releasing pressure generated in the leaktight tank;
a piston-forming device disposed inside the leaktight tank so as to be immersed in the liquid contained in the leaktight tank, which piston-forming device is capable of being set in reciprocating movement between an upper position and a lower position, the piston-forming device comprising a first, float-forming portion capable of bringing the piston-forming device into the upper position and a second portion forming an output shaft; and
a converter device coupled to the output shaft, which converter device is capable of converting the reciprocating movement of the piston-forming device into mechanical or electrical energy,
the generator being configured in such a way that, in operation, the leaktight tank is filled with liquid, and in such a way as to repeat the following sequence of operating phases in order to induce the reciprocating movement of the piston-forming device, namely:
a first operating phase during which the intake valve is closed and the vertical supply column is filled with liquid so as to form a column of liquid above the leaktight tank;
a second operating phase during which the exhaust valve is closed and the intake valve is open in order to connect the vertical supply column and the leaktight tank, generating an increase in pressure in the leaktight tank and causing a displacement of the piston-forming device to the lower position; and
a third operating phase during which the intake valve is closed and the exhaust valve is open in order to release excess pressure formed inside the leaktight tank, allowing the piston-forming device to return to the upper position under the action of the first, float-forming portion.

2. The generator according to claim 1, wherein the second portion forming the output shaft comprises a plurality of individual output shafts.

3. The generator according to claim 2, wherein each individual output shaft is coupled to a dedicated float device, the float devices being coupled to one another in order to constitute the first, float-forming portion of the piston-forming device.

4. The generator according to claim 1, wherein each output shaft is provided with a compressible cuff ensuring sealing between the liquid contained in the leaktight tank and a part of the output shaft that is disposed inside the leaktight tank, the compressible cuff defining a compressible volume devoid of liquid covering the part of the output shaft that is disposed inside the leaktight tank.

5. The generator according to claim 1, wherein the first, float-forming portion also forms a head of the piston-forming device.

6. The generator according to claim 1, wherein the output shaft emerges partly outside the leaktight tank, and wherein the converter device is coupled to the part of the output shaft emerging outside the leaktight tank.

7. The generator according to claim 6, wherein the output shaft emerges through a bottom part of the leaktight tank.

8. The generator according to claim 4, wherein the output shaft emerges partly outside the leaktight tank,
wherein the converter device is coupled to the part of the output shaft emerging outside the leaktight tank,
and wherein the compressible cuff is interposed between the first, float-forming portion and an internal wall of the leaktight tank.

9. The generator according to claim 8, wherein the output shaft emerges through a bottom part of the leaktight tank.

10. The generator according to claim 1, wherein the converter device comprises a mechanism capable of converting the reciprocating movement of the piston-forming device into a rotary movement.

11. The generator according to claim 10, wherein the converter device further comprises an alternator driven by the rotary movement in order to produce electrical energy.

12. The generator according to claim 1, further comprising a device for automatically controlling opening and closing of the intake and exhaust valves.

13. The generator according to claim 12, wherein the device for automatically controlling the opening and closing of the intake and exhaust valves is a mechanical distributor.

14. The generator according to claim 1, further comprising a starter for initiating rotation of a flywheel coupled to the generator, the generator being configured so as to maintain rotation of the flywheel.

15. The generator according to claim 1, wherein the vertical supply column is configured to allow formation of a column of liquid having a height of the order of 20 to 60 inches.

16. The generator according to claim 15, wherein the inner diameter of the vertical supply column is less than 8 inches.

17. The generator according to claim 1, wherein the capacity of the leaktight tank is of the order of 5 to 13.5 US gallons.

18. An installation comprising a generator according to claim 1 that is supplied with liquid.

19. The installation according to claim 18, wherein the generator is supplied with water.

20. The installation according to claim 19, wherein the generator is supplied by means of a rainwater collection tank or a running water supply.

21. The installation according to claim 18, further comprising:
   a supply tank capable of supplying the liquid necessary for filling the vertical supply column;
   a collection tank capable of recovering the liquid coming from the leaktight tank; and
   a pump capable of returning the liquid from the collection tank to the supply tank.

22. The installation according to claim 21, wherein the pump is supplied with energy produced by photovoltaic panels or by a wind turbine.

23. A method of generating mechanical or electrical energy using the generator according to claim 1, comprising the following steps:
   a) closing the intake valve and filling the vertical supply column with liquid so as to form a column of liquid above the leaktight tank which is filled with liquid;
   b) closing the exhaust valve and opening the intake valve in order to connect the vertical supply column and the leaktight tank, generating an increase in pressure in the leaktight tank and causing a displacement of the piston-forming device to the lower position;
   c) closing the intake valve and opening the exhaust valve so as to release excess pressure formed inside the leaktight tank, allowing the piston-forming device to return to the upper position under the action of the first, float-forming portion; and
   d) repeating steps a) to d) so as to induce the reciprocating movement of the piston-forming device and allow the converter device to convert this reciprocating movement into mechanical or electrical energy.

* * * * *